United States Patent [19]
Midgley

[11] 4,346,786
[45] Aug. 31, 1982

[54] LUBRICATION SYSTEM

[75] Inventor: Ronald A. Midgley, St. Albans, England

[73] Assignee: Rolls-Royce Limited, London, England

[21] Appl. No.: 177,514

[22] Filed: Aug. 12, 1980

[30] Foreign Application Priority Data

Sep. 29, 1979 [GB] United Kingdom ............... 7933868

[51] Int. Cl.³ ............................................. F01M 11/06
[52] U.S. Cl. ..................................... 184/6.2; 184/6.4
[58] Field of Search ...................... 184/6.2, 6.4, 6.11

[56] References Cited

U.S. PATENT DOCUMENTS

| | | | |
|---|---|---|---|
| 2,239,098 | 4/1941 | Hunter | 184/6.2 X |
| 2,364,119 | 12/1944 | Anderson | 184/6.2 X |
| 2,723,002 | 11/1955 | Garnier | 184/6.2 |
| 4,023,548 | 5/1977 | Prasch | 184/6.2 X |
| 4,117,907 | 10/1978 | Lechler | 184/6.2 |
| 4,153,141 | 5/1979 | Methlie | 184/6.4 X |
| 4,284,174 | 8/1981 | Salvana et al. | 184/6.4 |

Primary Examiner—David H. Brown
Attorney, Agent, or Firm—Cushman, Darby & Cushman

[57] ABSTRACT

A lubrication system comprises a chamber adapted to contain a lubricant and a duct to convey lubricant from the chamber to the apparatus to be lubricated. A pipe is adapted to introduce air into the lubricant flowing through the duct so that for a given flow rate through the duct the rate at which lubricant is withdrawn from the chamber is reduced when compared with the rate when no air is introduced into the lubricant flow.

13 Claims, 4 Drawing Figures

LUBRICATION SYSTEM

This invention relates to lubrication systems and in particular to lubrication systems which include a tank adapted to maintain a reservoir of the lubricant used in such systems.

Lubrication systems which include tanks adapted to maintain a reservoir of the lubricant are conventionally closed circuit systems in which lubricant is withdrawn from the reservoir, conveyed to the components to be lubricated and subsequently returned to the reservoir. Thus under normal conditions, a supply of lubricant is always available within the tank to be drawn off for lubrication use.

If the lubrication system is for use in apparatus subject to movement, it is frequently necessary for the tank to be mounted on the apparatus and consequently subject to that movement. In these circumstances, it sometimes happens that the lubricant contained within the tank moves to such an extent that any lubricant flow from the tank is interrupted. Such an interruption in lubricant could be crucial since it may result in the failure of the components to which the lubricant is conveyed.

Gasturbine engines adapted for propelling aircraft are provided with lubrication systems which include tanks for storing oil prior to that oil being conveyed to various bearings within the engine. If the oil flow from the tank is interrupted, even for a short period, there is a possibility that some bearings, especially plain bearings, could fail through lack of lubrication. Since aircraft are required to alter their attitude in flight, it is clear that in certain circumstances, an interruption in oil flow could occur with consequent bearing damage. A particularly troublesome maneuver sometimes required to be performed is one in which the aircraft is required to fly inverted. In such a situation, oil contained within the tank flows to the opposite side of the tank thereby causing an interruption in the oil flow from the tank.

In the commonly assigned (Rolls-Royce Limited) co-pending U.S. patent application of Bennett et al, Ser. No. 177,513, filed Aug. 12, 1980 (now U.S. Pat. No. 4,287,913, issued Sept. 8, 1981) there is disclosed an oil tank which is inter alia adapted such that when the tank is inverted, a portion of the oil within the tank is trapped in the region of the tank around its oil outlet. Consequently during tank inversion, a continuity of oil flow from the tank is achieved for a finite time period.

It sometimes happens, however, that constraints are imposed upon the dimensions of the oil tank by the nature of its location. Thus it may be that the tank must be of such a size that the portion of oil trapped in the tank for use when the tank is inverted is of insufficient volume to provide an oil flow for a finite time period of adequate duration.

It is an object of the present invention to provide a lubrication system which includes a chamber from which the lubricant is drawn through an outlet duct and which is so adapted that for a given lubricant flow rate through the outlet duct of the chamber, the rate at which lubricant is withdrawn from the chamber is reduced.

According to one aspect of the present invention, a lubrication system comprises a chamber adapted to contain a lubricant and duct means adapted to convey lubricant from said chamber to apparatus to be lubricated, said duct means being adapted in operation to introduce a gas into lubricant passing therethrough whereby for a given flow rate through said duct means, the rate at which lubricant is withdrawn from said chamber is reduced when compared with the rate when no gas is introduced into said lubricant passing through said duct means.

Said gas introduced in operation into said lubricant passing through said duct means is preferably air.

Said duct means is preferably so adapted that the lubricant/air ratio within said duct means is in the region of 1:4.

According to a further aspect of the present invention, a tank suitable for holding a lubricant and adapted to comprise a portion of a lubrication system comprises first and second baffles respectively adapted to divide the interior of said tank into first, second and third series interconnected chambers, each adapted to contain said lubricant, an inlet adapted to supply a mixture of a gas and said lubricant to said first chamber, outlet duct means adapted to withdraw said lubricant from said third chamber, and venting means having an outlet through which said gas present in said first chamber is vented, said baffles being so adapted and arranged that when said tank is in its normal spacial disposition, oil supplied in operation to said first chamber flows into said third via said second chamber and if said tank is subsequently inverted with respect to said normal spacial disposition, any flow of lubricant from said third chamber to said second chamber is prevented or is of a sufficiently low level that an adequate quantity of lubricant is retained within said third chamber to provide a continuity of lubricant flow through said outlet duct means for a finite time period and insufficient lubricant flows from said second chamber into said first chamber to obstruct said venting means, said outlet duct means being adapted to introduce a gas into lubricant passing therethrough when said tank is inverted with respect to said normal spacial disposition.

Said first baffle dividing said first and second chambers is preferably so inclined and configured that when said tank is in said normal spacial disposition, said lubricant contained in operation in said first chamber is directed across said tank and into a generally downwardly extending passageway defined between said first baffle and said tank wall, and thence into duct means adapted to interconnect the lower region of said passageway with that portion of the lower region of said second chamber on the opposite side of said tank to said passageway.

Said second baffle dividing said second and third chambers is preferably so inclined and configured that when said tank is in said normal spacial disposition, lubricant contained in operation in said second chamber is directed across said tank and into a passageway interconnecting said second and third chambers, and defined between said second baffle and the wall of said tank, the first portion of said passageway being on the same side of said tank as said passageway interconnecting said first chamber and said duct means, and extending in a generally downward direction to the base of said tank, the remaining portion thence extending in a generally upward direction to exhaust said lubricant from said second chamber in the upper region of said third chamber on the opposite side of said tank to said passageway interconnecting said first chamber and said duct means, the outlet of said outlet duct means being positioned immediately below the position where said lubricant is exhausted from said passageway into said third chamber.

Said gas introduced in operation into said outlet duct means is preferably air.

Said outlet duct means is preferably adapted to introduce said air into said lubricant passing therethrough at a location within said tank.

Said outlet duct means is preferably provided with pipe means interconnecting the interior of said outlet duct means with a portion of the interior of said tank which, when said tank is inverted, contains air, but contains said lubricant when said tank is in said normal spacial disposition, said pipe means being so arranged that when said tank is inverted, lubricant passing through said outlet duct means induces an air flow through said pipe means and directs that airflow into said lubricant in said outlet duct means.

Said pipe means preferably interconnects the interior of said outlet duct means with said first portion of said passageway interconnecting said second and third chambers.

Said pipe means is preferably so dimensioned that the lubricant/air ratio within said outlet duct means is in the region of 1:4.

Said tank is preferably provided with pumping means adapted, when said tank is in said normal spacial disposition, to pump into said first chamber any air which may collect in operation in said second and third chambers.

Said pumping means preferably comprises two venturi ejector pumps.

Said venting means through which gas may be vented from said first chamber is preferably adapted to project into said first chamber to such an extent that in all spacial dispositions of said tank, the outlet of said venting means remains above the surface of the lubricant contained in operation in said first chamber.

Said second chamber may be additionally supplied with said lubricant otherwise than from said first chamber.

Said lubricant supplied to said tank may be an oil.

Said tank may be an oil tank suitable for an aircraft mounted gas turbine engine.

The invention will now be described with reference to the accompanying drawings in which.

Figure 1:
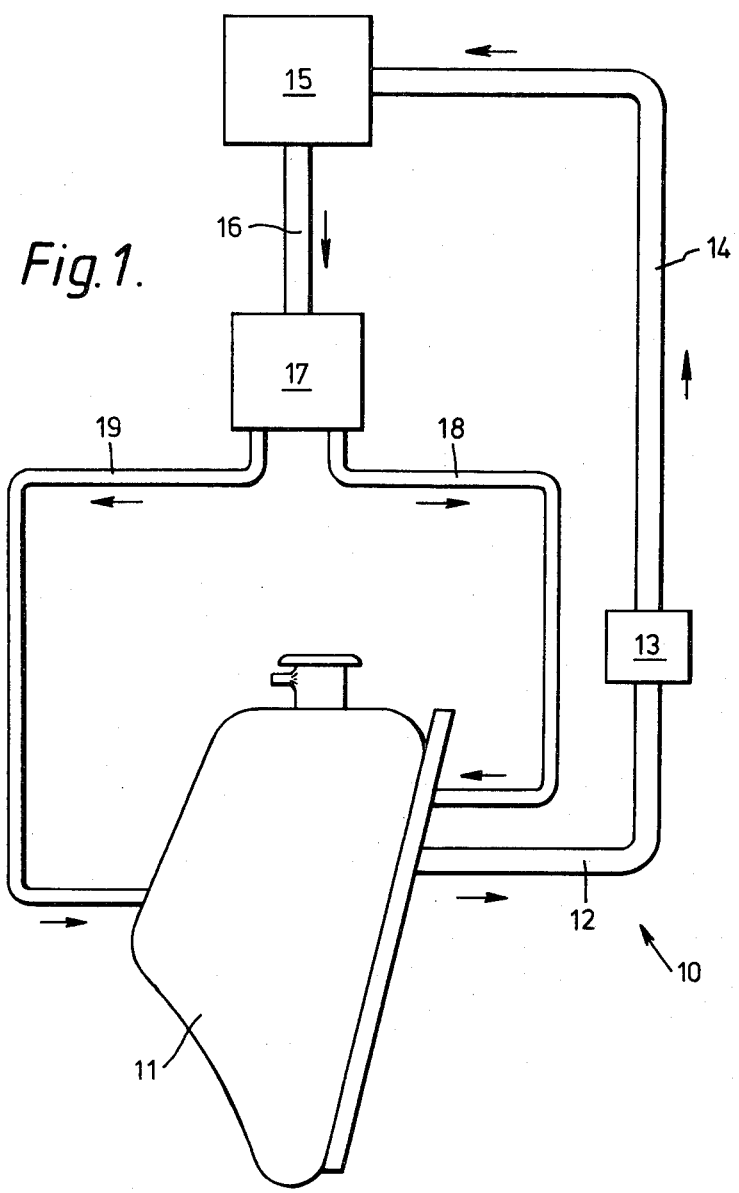
FIG. 1 is a diagrammatic representation of a lubrication system in accordance with the present invention.

With reference to FIG. 1, a lubrication system generally indicated at 10 comprises an oil tank 11 having an outlet duct 12 which serves to interconnect oil contained within the tank 11 with an oil pump 13. The oil pump 13 pumps the oil through a duct 14 to the apparatus 15 to be lubricated from where it is directed through a duct 16 to a centrifugal separator 17. The centrifugal separator 17 is of well known construction and is adapted to separate aerated oil from the apparatus 15 to be lubricated into two streams: a first stream which is predominantly air and a second which is predominantly oil. The air and oil streams are returned to the tank 11 through ducts 18 and 19 respectively.

Figure 2:
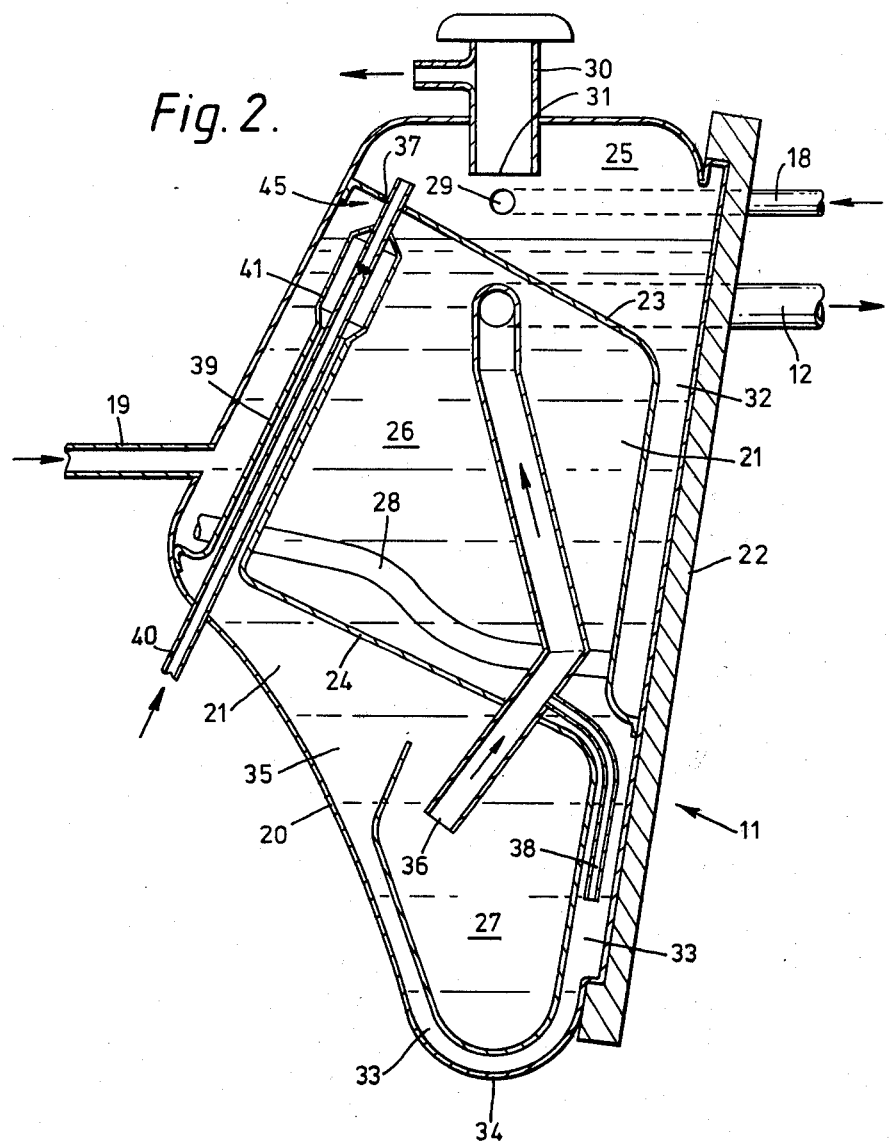
FIG. 2 is a sectioned side view of the tank shown in the lubrication system of FIG. 1.

The tank 11, which can be more easily seen in FIG. 2, is defined by a wall 20 and contains an oil 21. A mounting feature 22 is provided on one side of the tank 11 by means of which the tank 11 is attached to a gas turbine engine (not shown) adapted to power an aircraft.

Since in operation, gas turbine engines adapted to power aircraft are subjected to changes in attitude and acceleration forces during flight, then it follows that the spacial disposition of the tank 11 and oil 21 contained within it will change accordingly. More specifically, the spacial disposition of the tank 11 will be subjecet to changes in aircraft attitude and the spacial disposition of the oil 21 subject to changes in acceleration forces as well as changes in aircraft attitude. The spacial dispositions of the tank 11 and oil 21 shown in FIG. 2 are those adopted when the aircraft on which they are mounted is in level flight and flying at a constant speed without changes in its direction of flight. Throughout this specification the spacial disposition of the tank 11 shown in FIG. 2 will be referred to as its normal spacial disposition. In the interests of clarity, however, it is to be assumed throughout this specification (unless otherwise stated) that the disposition of the oil 21 is that which it adopts when subjected only to acceleration forces due to gravity. It will be appreciated that if the oil 21 is subjected to acceleration forces other than those due to gravity and the tank 11 is maintained in its normal spacial disposition, the movement of the oil 21 within the tank 11 will be the same as that which would result from alterations in the spacial disposition of the tank 11.

The tank 11 contains first and second baffles 23 and 24 which divide its interior into three chambers 25, 26 and 27. The first chamber 25 is situated in the upper region of the tank 11 and a duct 18 is adapted to exhaust a mixture of air and oil into the chamber 25 through an inlet orifice 29. The first chamber 25 is also provided with a vent 30 having an outlet 31 through which the air is exhausted. The first baffle 23 is inclined over a portion of its length to provide an inclined floor to the chamber 25. However on the right hand side of the tank 11 (when viewed in FIG. 2) the first baffle 23 is angled so that it cooperates with the wall 20 of the tank 11 to define a generally downwardly extending passageway 32 which terminates below the mid point of the tank 11. Thus oil delivered to the first chamber 25 through the duct 18 initially de-aerates in the first chamber 25 before flowing into the passageway 32.

The second chamber 26 is situated immediately below the first chamber 25 between the first and second baffles 23 and 24 and is fed with oil from the passageway 32 by a duct 28 which extends from the lower region of the passageway 32 to that portion of the lower region of the second chamber 26 on the left hand side of the tank 11. Oil is additionally supplied to the second chamber 26 through the duct 19, this supply of oil being from the vortex separator 17 and substantially air free.

The second baffle 24 is inclined over a portion of its length in a similar manner to the first baffle 23 so as to provide an inclined floor to the chamber 26 and angled and curved so that it cooperates with the wall 20 of the tank 11 to define a passageway 33 interconnecting the second chamber 26 with the third chamber 27. More specifically, the passageway 33 has a first portion which extends in a generally downward direction on the right hand side of the tank 11 to the tank base 34. The remaining portion of the passageway 33 then extends from the tank base 34 in a generally upward direction on the opposite side of the tank 11 to the first portion of the passageway 33 to terminate in a flared outlet 35 in the upper region of the third chamber 27. Consequently oil is supplied to the third chamber 27 from the second chamber 26 via the passageway 33.

It will be seen therefore that the first, second and third chambers 25, 26 and 27 are series interconnected by the passageways 32 and 33 and the duct 28 so that when the tank 11 is in its normal spacial disposition, oil delivered to the first chamber 25 flows under the influence of gravity into the third chamber 27 via the second chamber 26.

Oil contained in the third chamber 27 is drawn off through the outlet duct 12 which is provided with an outlet 36 which is positioned immediately below the flared outlet 35.

As previously stated, oil drawn off from the third chamber 27 directed to the apparatus 15 to be lubricated from where it is passed into a centrifugal separator 17. Since centrifugal separators are not 100% efficient, the first chamber 25 is in fact supplied with an oil mist which separates out within the first chamber 25 so that the air constituent of the mist is exhausted through the outlet 31 of the vent 30 whilst the remaining oil flows down the inclined portion of the first baffle 23 and into the passageway 32. It will be appreciated however that whilst the described embodiment of the present invention employs a centrifugal separator in order to deaerate the oil, deaeration could in fact take place exclusively within the first chamber 25. Thus oil contained in the first chamber 25 could deaerate during its residence time in the first chamber 25, the separated air being exhausted from the first chamber 25 as previously described through the outlet 31 of the vent 30. In such an arrangement of course the centrifugal separator 17 could be dispensed with and the second chamber 26 would not be supplied with oil through the duct 19.

Since it is likely during the operation of the tank 11, that small amounts of air will pass into the second chamber 26, a hole 37 is provided in the uppermost portion of the first baffle 23. The hole 37 ensures that any air which may collect in the upper region of the second chamber 26 passes into the first chamber 25 from where it is exhausted through the outlet 31 of the vent 30.

Since oil supplied to the tank 11 is deaerated in both the first and second chambers 25 and 26, the oil which finally drains into the third chamber 27 and is drawn off through the tank outlet duct 12 is substantially air free.

Figure 3:
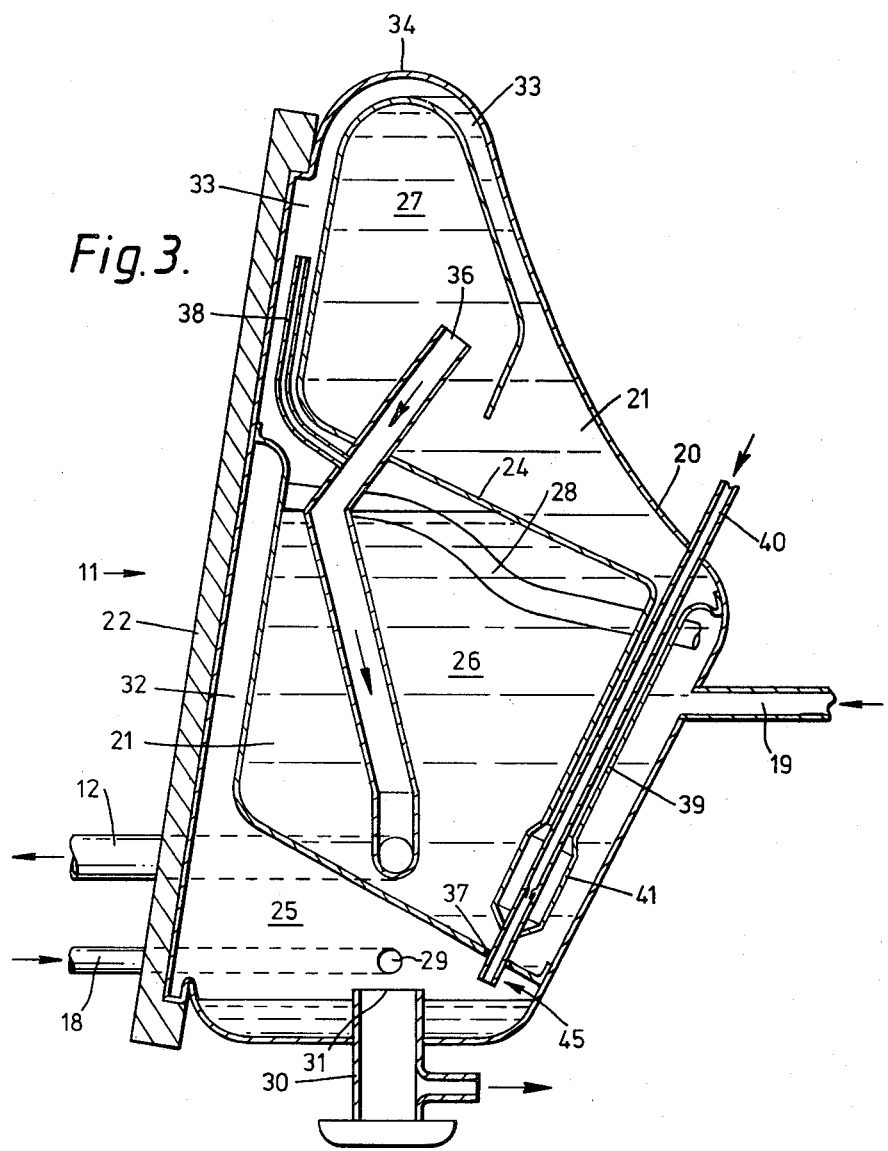
FIG. 3 is a sectioned side view of the same tank as shown in FIG. 1 but showing the tank in an inverted position.

If, as a result of a change in aircraft attitude the tank 11 is inverted, the oil contained within the tank will be re-positioned as can be seen in FIG. 3.

Thus oil contained in the passageway 32 will drain back into the first chamber 25. In order to prevent the oil contained within the first chamber 25 blocking the vent outlet 31, the body of the vent 30 is adapted to project into the first chamber 25 to such an extent that in all angular dispositions of the tank 11, the vent outlet 31 remains above the oil level within the first chamber 25.

The majority of the oil contained in the second chamber 26 is prevented from flowing into the first chamber 25 by the dispositions of the first baffle 23 and the duct 28. A small amount of oil will flow into the first chamber 25 through the hole 37 in the first baffle 23. However the hole 37 is of such a diameter that whilst it is of sufficient size to permit air to pass between the chambers 26 and 25, it is too small to permit any significant oil flow.

A portion of the oil contained in the first portion of the passageway 33 will flow back into the second chamber 26. However the oil contained in the remaining portion of the passageway 33 together with the oil contained in the third chamber 27 will remain in position so that a reservoir of oil is available within the third chamber 27 to be drawn off through the outlet duct 12. It will be seen therefore that the reservoir of oil available within the third chamber 27 will provide a continuity of oil flow through the outlet duct 12 for a finite time period. Consequently the apparatus 15 to be lubricated is provided with a continued oil supply for a finite time period when the tank 11 is inverted.

In certain circumstances, it is desirable that the gas turbine engine on which the tank 11 is mounted should operate inverted for a time period longer than the finite time period during which the third chamber 27 provides a continued oil supply to the oil outlet duct 12. The dimensions of the third chamber 27 may of course be altered so as to increase its oil capacity. However such alteration may not be possible because of constraints provided by the situation of the oil tank 10. In such a situation, the oil outlet duct 12 is provided with a pipe 38 which interconnects the interior of the oil outlet duct 12 with the first portion of the passageway 33 between the second and third chambers 26 and 27. Thus when the tank 11 is inverted, the pipe 38 is exposed to the air which is contained in the first portion of the passageway 33. Consequently the flow of oil through the oil outlet duct 12 will induce a flow of air through the pipe 38 which will become entrained in the oil flowing through the oil outlet duct 12. The entrained air has the effect of diluting the oil so that the finite time period during which the reservoir of oil within the third chamber 27 provides a continuous supply of oil is extended. We prefer to dimension the pipe 38 so that the oil/air ratio of the contents of the oil outlet duct 12 is in the region of 1:4. Consequently the finite time period during which the third chamber 27 provides a continuous supply of oil is increased by four times.

Notwithstanding that the oil derived from the tank 11 is aerated in this manner when the tank 11 is inverted, it still provides adequate lubrication for the apparatus 15 to be lubricated. Thus we have found that even plain bearings may be effectively lubricated by such aerated oil.

It will be appreciated that although the foregoing description has been made with respect to a tank 11 that has been inverted, the tank 11 will still function in the same manner if it is maintained in its normal spacial disposition but exposed to acceleration in a downward direction at a rate greater than the acceleration due to gravity.

It will also be appreciated that whilst the present invention has been described with respect to a pipe 38 which is adapted to introduce air into the oil outlet duct 12 within the tank 11, the pipe 38 could in fact be positioned externally of the tank 11. In such circumstances the pipe 38 would have to be suitably adapted so that air would only be admitted to the oil outlet duct 12 when the tank 11 adopts certains spacial dispositions.

When the tank 11 is returned to its normal spacial disposition after inversion, it will be apparent that the air will have collected in the second and third chamber 26 and 27. It is important that this air, especially that in the third chamber 27, should be removed as quickly as possible. If it is not, a further inversion of the tank 11 could find the third chamber 27 with insufficient oil to maintain an oil flow through the oil outlet duct 12 for the required finite time period. In order to facilitate the removal of this air, the upper region of the third chamber 27 is provided with an enclosed extension piece 39 which extends into the upper region of the second chamber 26. The extension piece 39 contains a duct 40 which projects through the end of the extension piece 39 and the hole 37 in the first baffle 23 to terminte in the first chamber 25.

Figure 4:
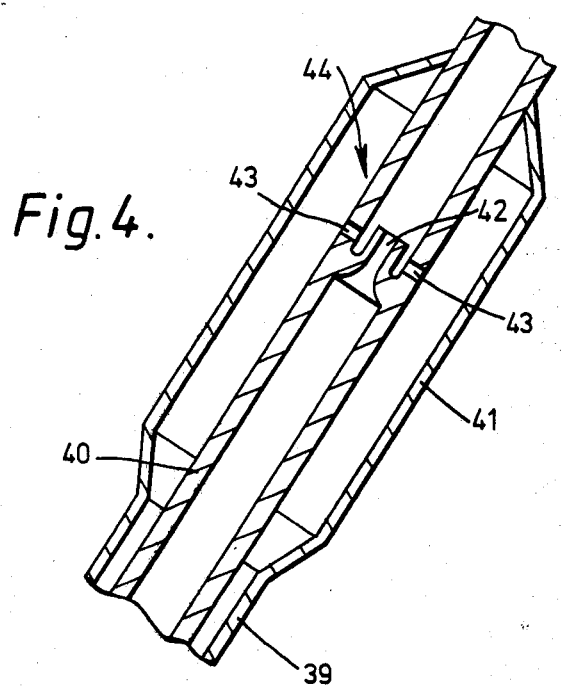
FIG. 4 is an enlarged sectioned view of a portion of the tank shown in FIG. 2.

The upper portion of the extension piece 39 is enlarged at 41 as can be seen more clearly in FIG. 4. The portion of the duct 40 within the enlarged extension piece portion 41 is provided with a venturi 42 adjacent to which are two small diameter passages 43 interconnecting the interior of the duct 40 with that of the extension piece 39. In operation, air is supplied under pressure to the duct 40 so that the venturi 42 and the passage 43 constitute a venturi ejector pump 44.

Thus air which collects in the third chamber 27 during inversion of the tank 11 migrates into the extension piece 39 when the tank 11 returns to its normal spacial disposition. The ejector pump 44 then pumps that air through the passages 43 and into the airstream passing through the duct 40. Air from the duct 40 is exhausted into the first chamber 25 from where it is vented through the vent 30. Consequently any air which has collected in the third chamber 27 is rapidly pumped into the first chamber 25 as soon as the tank 11 returns to its normal spacial disposition. When the air has been pumped out of the extension piece 39, it is inevitable that a certain amount of oil will then be pumped by the ejector pump 44 from the extension piece 39 into the first chamber 25. The passages 43 are so dimensioned however that the flow of oil is minimal.

The hole 37 in the first baffle 23 is of a slightly larger diameter than that of the air duct 40 so that the hole 37 and the air duct 40 together constitute a second ejector pump 45, which serves to pump air from the second chamber 26 into the first chamber 25. Consequently the oil level within the second chamber 26 is also rapidly restored to its normal level after an excursion in which the tank 11 has been inverted.

The operation of the tank 11 in accordance with the present invention has been described with respect to the tank 11 in its normal spacial disposition and in an inverted disposition. It will be appreciated however that the tank will function in other spacial dispositions. Thus depending on the spacial disposition being considered, the oil outlet duct 12 will have access to either a fixed reservoir of oil in the third chamber 27 which will provide an oil supply for a finite time period or alternatively a reservoir of oil which is continuously replenished by oil supplied by the second and first chambers 26 and 25. Moreover the internal configuration of the tank 11 is such that in other spacial dispositions of the tank 11 insufficient oil flows from the second chamber 26 into the first chamber 25 to obstruct the outlet 31 of the vent 30.

I claim:

1. A tank suitable for holding a lubricant and adapted to comprise a portion of a lubrication system comprising first and second baffles respectively adapted to divide the interior of said tank into first, second and third series interconnected chambers, each adapted to contain said lubricant, an inlet adapted to supply a mixture of a gas and a lubricant to said first chamber, outlet duct means adapted to withdraw lubricant from said third chamber and venting means having an outlet through which said gas present in said first chamber is vented, said baffles being so adapted and arranged than when said tank is in its normal spacial disposition, lubricant supplied in operation to said first chamber flows into said third chamber via said second chamber, and if said tank is subsequently inverted with respect to said normal spacial disposition, any flow of lubricant from said third chamber to said second chamber is prevented or is of a sufficiently low level that an adequate quantity of lubricant is retained within said third chamber to provide a continuity of lubricant flow through said outlet duct means for a finite time period, and insufficient lubricant flows from said second chamber into said third chamber to obstruct said venting means, said outlet duct means being provided with means adapted to introduce a gas into lubricant passing therethrough when said tank is inverted with respect to said normal spacial disposition.

2. A tank as claimed in claim 1 wherein said gas introduced in operation into said outlet duct means is air.

3. A tank as claimed in claim 1 wherein said venting means through which gas may be vented from said first chamber projects into said first chamber to such an extent that in all spacial dispositions of said tank, the outlet of said venting means remains above the surface of the lubricant contained in operation in said first chamber.

4. A tank as claimed in claim 1 including oil inlet duct means connected to said second chamber for additionally supplying lubricant to said second chamber other than from said first chamber.

5. A tank suitable for holding a lubricant as claimed in claim 4 wherein said first baffle and the wall of said tank together define a generally downwardly extending first passageway, a second duct means being provided to interconnect the lower region of said passageway with that portion of the lower region of said second chamber on the opposite side of said tank to said passageway, said first baffle being so inclined and configured that when said tank is in said normal spacial disposition, said lubricant contained in operation in said first chamber is directed across said tank and into said generally downwardly extending first passageway, said lubricant thence flowing into said second duct means.

6. A tank suitable for holding a lubricant as claimed in claim 5 wherein said second baffle and the wall of said tank together define a second passageway interconnecting said second and third chambers, the first portion of said second passageway being on the same side of said tank as said first passageway interconnecting said first chamber and said second duct means, and extending in a generally downward direction to the base of said tank, the remaining portion of said second passageway thence extending in a generally upward direction to terminate in the upper region of said third chamber on the opposite side of said tank to said first passageway interconnecting said first chamber and said second duct means, the outlet of said outlet duct means being positioned immediately below the position where said second passageway interconnecting said second and third chambers terminates in said third chamber, said second baffle being so inclined and configured that when said tank is in said normal spacial disposition, lubricant contained in operation in said second chamber is directed across said tank and into said second passageway interconnecting said second and third chambers.

7. A tank as claimed in claim 1 wherein said tank is provided with pumping means adapted, when said tank is in said normal spacial disposition, to pump into said first chamber any air which may collect in operation in said second and third chambers.

8. A tank as claimed in claim 7 wherein said pumping means comprises two venturi ejector pumps.

9. A tank as claimed in claim 1 wherein said lubricant supplied to said tank is an oil.

10. A tank as claimed in claim 3 wherein said tank is an oil tank suitable for an aircraft mounted gas turbine engine.

11. A tank as claimed in claim 1 wherein said means adapted to introduce a gas into lubricant passing through said outlet duct means comprises pipe means interconnecting the interior of said outlet duct means with a portion of the interior of said tank which, when said tank is inverted, contains air, but contains lubricant when said tank is in said normal spacial disposition, said pipe means being so arranged that when said tank is inverted, lubricant passing through said outlet duct means induces an air flow through said pipe means and directs that airflow into said lubricant in said outlet duct means.

12. A tank as claimed in claim 11 wherein said pipe means interconnects the interior of said outlet duct means with said first portion of said second passageway interconnecting said second and third chambers.

13. A tank as claimed in claim 11 wherein said pipe means is so dimensioned that the lubricant/air ratio within said outlet duct means is in the region of 1:4.

* * * * *